US011451456B2

(12) United States Patent
Tedaldi et al.

(10) Patent No.: US 11,451,456 B2
(45) Date of Patent: Sep. 20, 2022

(54) LEARNING STABLE REPRESENTATIONS OF DEVICES FOR CLUSTERING-BASED DEVICE CLASSIFICATION SYSTEMS

(71) Applicant: Cisco Technology, Inc., San Jose, CA (US)

(72) Inventors: David Tedaldi, Zurich (CH); Grégory Mermoud, Veyras VS (CH); Pierre-Andre Savalle, Rueil-Malmaison (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 277 days.

(21) Appl. No.: 16/389,013

(22) Filed: Apr. 19, 2019

(65) Prior Publication Data

US 2020/0336397 A1     Oct. 22, 2020

(51) Int. Cl.
| | |
|---|---|
| *H04L 43/065* | (2022.01) |
| *H04L 41/12* | (2022.01) |
| *G06N 20/00* | (2019.01) |
| *H04L 43/0817* | (2022.01) |
| *H04L 41/16* | (2022.01) |

(52) U.S. Cl.
CPC .......... *H04L 43/065* (2013.01); *G06N 20/00* (2019.01); *H04L 41/12* (2013.01); *H04L 41/16* (2013.01); *H04L 43/0817* (2013.01)

(58) Field of Classification Search
CPC ... H04L 43/065; H04L 41/12; H04L 43/0817; H04L 41/16; H04L 41/0893; H04L 12/2803; H04L 67/22; H04L 45/02; H04L 709/224; G06N 20/00
See application file for complete search history.

(56) References Cited

U.S. PATENT DOCUMENTS

| | | | |
|---|---|---|---|
| 8,341,717 B1 * | 12/2012 | Delker | H04L 63/20 |
| | | | 726/10 |
| 9,275,304 B2 | 3/2016 | Yoon et al. | |
| 9,514,248 B1 * | 12/2016 | Guan | H04L 29/06 |
| 10,049,302 B1 | 8/2018 | Liu et al. | |
| 10,218,726 B2 | 2/2019 | Vasseur et al. | |
| 10,924,353 B2 * | 2/2021 | Savalle | H04L 63/102 |
| 10,999,146 B1 * | 5/2021 | Savalle | G06F 16/353 |
| 11,018,943 B1 * | 5/2021 | Vasseur | H04L 63/20 |
| 11,049,349 B2 * | 6/2021 | Onischuk | G07C 13/00 |
| 11,153,347 B2 * | 10/2021 | Savalle | G06N 20/00 |
| 11,283,830 B2 * | 3/2022 | Vasseur | H04L 63/0263 |

(Continued)

*Primary Examiner* — Dhairya A Patel
(74) *Attorney, Agent, or Firm* — Behmke Innovation Group LLC; Kenneth J. Heywood; Jonathon P. Western

(57) ABSTRACT

In one embodiment, a device classification service obtains telemetry data for a plurality of devices in a network. The device classification service repeatedly assigns the devices to device clusters by applying clustering to the obtained telemetry data. The device classification service determines a measure of stability loss associated with the cluster assignments. The measure of stability loss is based in part on whether a device is repeatedly assigned to the same device cluster. The device classification service determines, based on the measure of stability loss, that the cluster assignments have stabilized. The device classification service obtains device type labels for the device clusters, after determining that the cluster assignments have stabilized.

20 Claims, 9 Drawing Sheets

(56) References Cited

U.S. PATENT DOCUMENTS

| | | | |
|---|---|---|---|
| 11,290,331 B2* | 3/2022 | Mermoud | H04L 45/507 |
| 11,297,079 B2* | 4/2022 | Vasseur | H04L 63/20 |
| 2003/0175720 A1* | 9/2003 | Bozinov | C40B 30/04 |
| | | | 506/9 |
| 2004/0243709 A1* | 12/2004 | Kalyanavarathan | |
| | | | H04L 67/1023 |
| | | | 709/226 |
| 2009/0197540 A1* | 8/2009 | Wild | H04L 1/20 |
| | | | 455/67.14 |
| 2011/0185193 A1* | 7/2011 | Grube | H04L 9/3242 |
| | | | 713/189 |
| 2011/0243081 A1* | 10/2011 | Liu | H04W 72/042 |
| | | | 370/329 |
| 2012/0155319 A1* | 6/2012 | Gerber | H04L 61/1511 |
| | | | 370/254 |
| 2013/0272186 A1* | 10/2013 | Mohanty | H04J 11/00 |
| | | | 370/312 |
| 2015/0092593 A1* | 4/2015 | Kompella | H04L 49/25 |
| | | | 370/254 |
| 2015/0261846 A1* | 9/2015 | Hall | G06F 16/34 |
| | | | 707/738 |
| 2016/0366565 A1* | 12/2016 | Fjelberg | H04W 24/02 |
| 2017/0046510 A1* | 2/2017 | Chen | G06N 20/00 |
| 2017/0104633 A1* | 4/2017 | Wen | H04L 41/0896 |
| 2017/0134232 A1* | 5/2017 | Palanciuc | H04L 41/0816 |
| 2017/0213153 A1 | 7/2017 | Wang et al. | |
| 2017/0279829 A1* | 9/2017 | Vasseur | H04L 63/1425 |
| 2017/0295067 A1* | 10/2017 | Bae | H04L 43/10 |
| 2018/0144139 A1* | 5/2018 | Cheng | H04L 63/0227 |
| 2018/0300180 A1* | 10/2018 | Shepard | G06F 11/0793 |
| 2019/0156211 A1* | 5/2019 | Dong | G06N 3/0454 |
| 2019/0188065 A1* | 6/2019 | Anghel | G06N 3/0427 |
| 2020/0044927 A1* | 2/2020 | Apostolopoulos | H04L 43/04 |
| 2020/0082272 A1* | 3/2020 | Gu | G06N 3/084 |
| 2020/0106795 A1* | 4/2020 | Servajean | G06N 20/10 |
| 2020/0134442 A1* | 4/2020 | Sim | G06Q 10/06311 |
| 2020/0192927 A1* | 6/2020 | Chawla | G06N 3/04 |
| 2020/0195508 A1* | 6/2020 | Benjamin | H04L 41/082 |
| 2021/0409312 A1* | 12/2021 | Chen | H04L 12/4633 |
| 2022/0130493 A1* | 4/2022 | Turner | G16C 20/40 |
| 2022/0137819 A1* | 5/2022 | Dong | G06F 3/0631 |
| | | | 711/170 |
| 2022/0139117 A1* | 5/2022 | Zhang | G07C 5/006 |
| | | | 701/29.4 |
| 2022/0141714 A1* | 5/2022 | Smith | H04W 12/69 |
| | | | 370/338 |

* cited by examiner

LEARNING STABLE REPRESENTATIONS OF DEVICES FOR CLUSTERING-BASED DEVICE CLASSIFICATION SYSTEMS

TECHNICAL FIELD

The present disclosure relates generally to computer networks, and, more particularly, to learning stable representations of devices for clustering-based device classification systems.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory device. However, with the ever-increasing number of different types of devices on a network, the lack of a ground truth (e.g., a device of type X has behavioral profile Y) makes identifying the actual type of a device challenging. Active labeling using clustering can help address this lack of a ground truth, but instability in a device cluster can also lead to misclassifying the types of some devices in the cluster.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
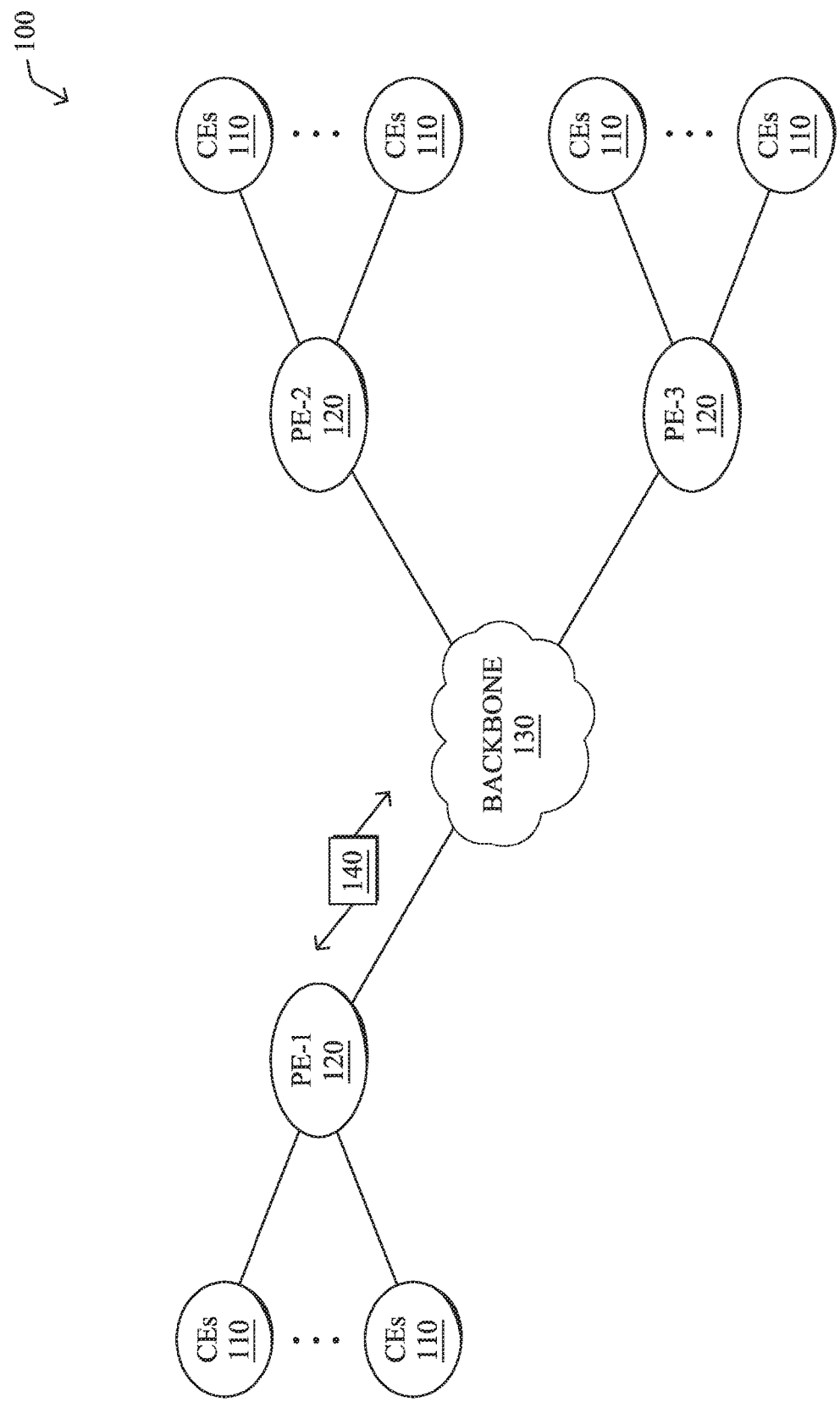
FIGS. 1A-1B illustrate an example communication network.

According to one or more embodiments of the disclosure, a device classification service obtains telemetry data for a plurality of devices in a network. The device classification service repeatedly assigns the devices to device clusters by applying clustering to the obtained telemetry data. The device classification service determines a measure of stability loss associated with the cluster assignments. The measure of stability loss is based in part on whether a device is repeatedly assigned to the same device cluster. The device classification service determines, based on the measure of stability loss, that the cluster assignments have stabilized. The device classification service obtains device type labels for the device clusters, after determining that the cluster assignments have stabilized.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
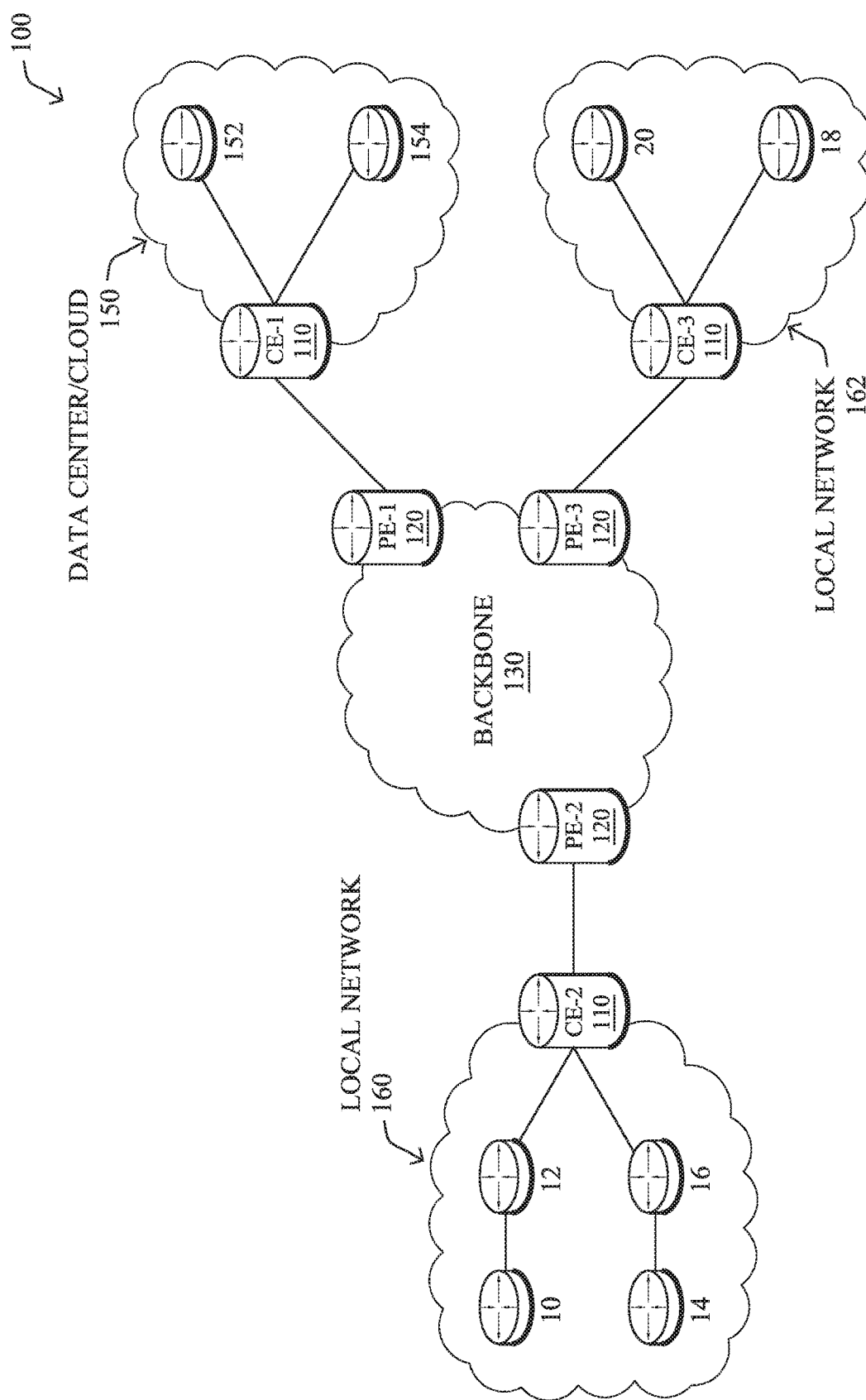

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
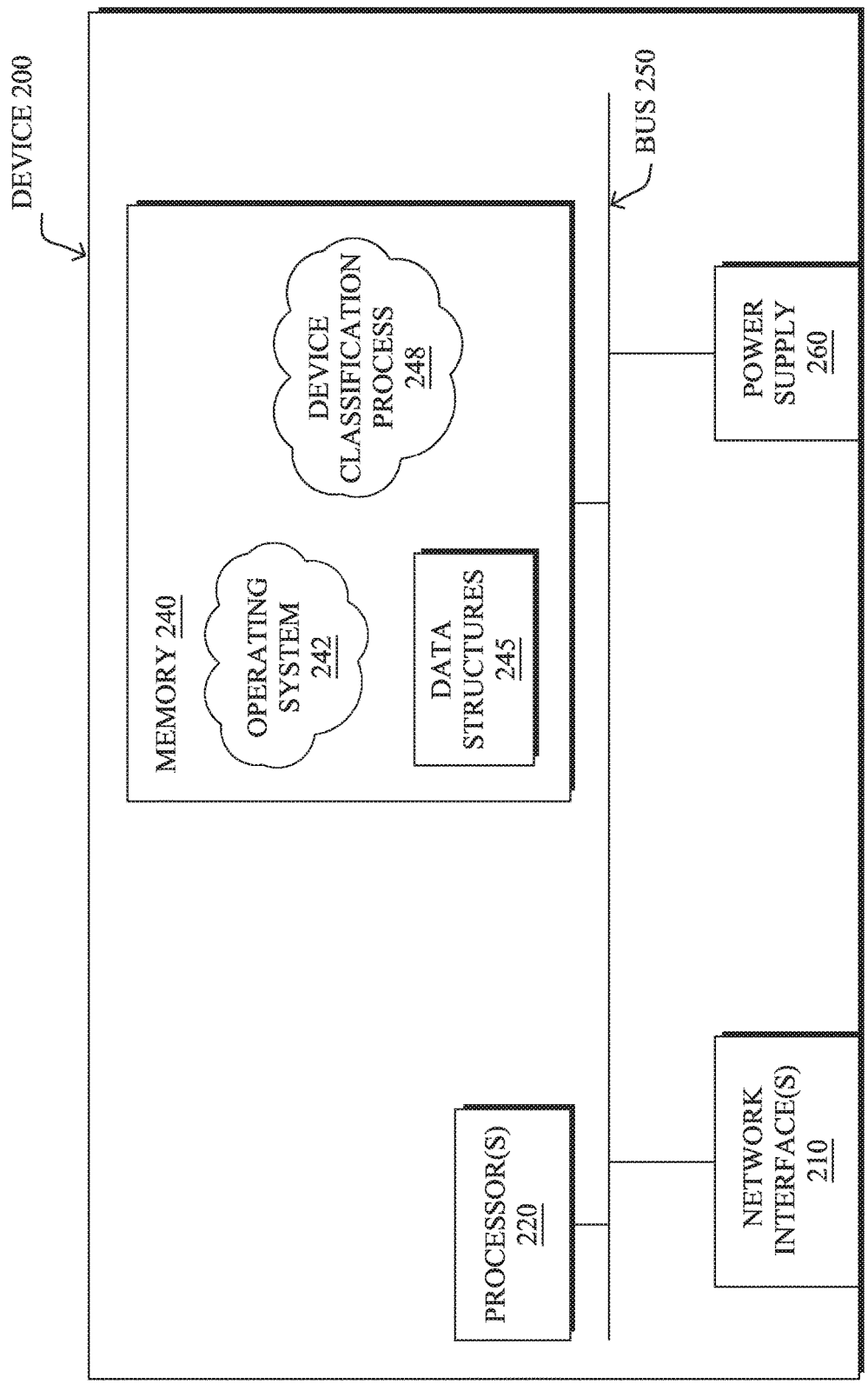
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
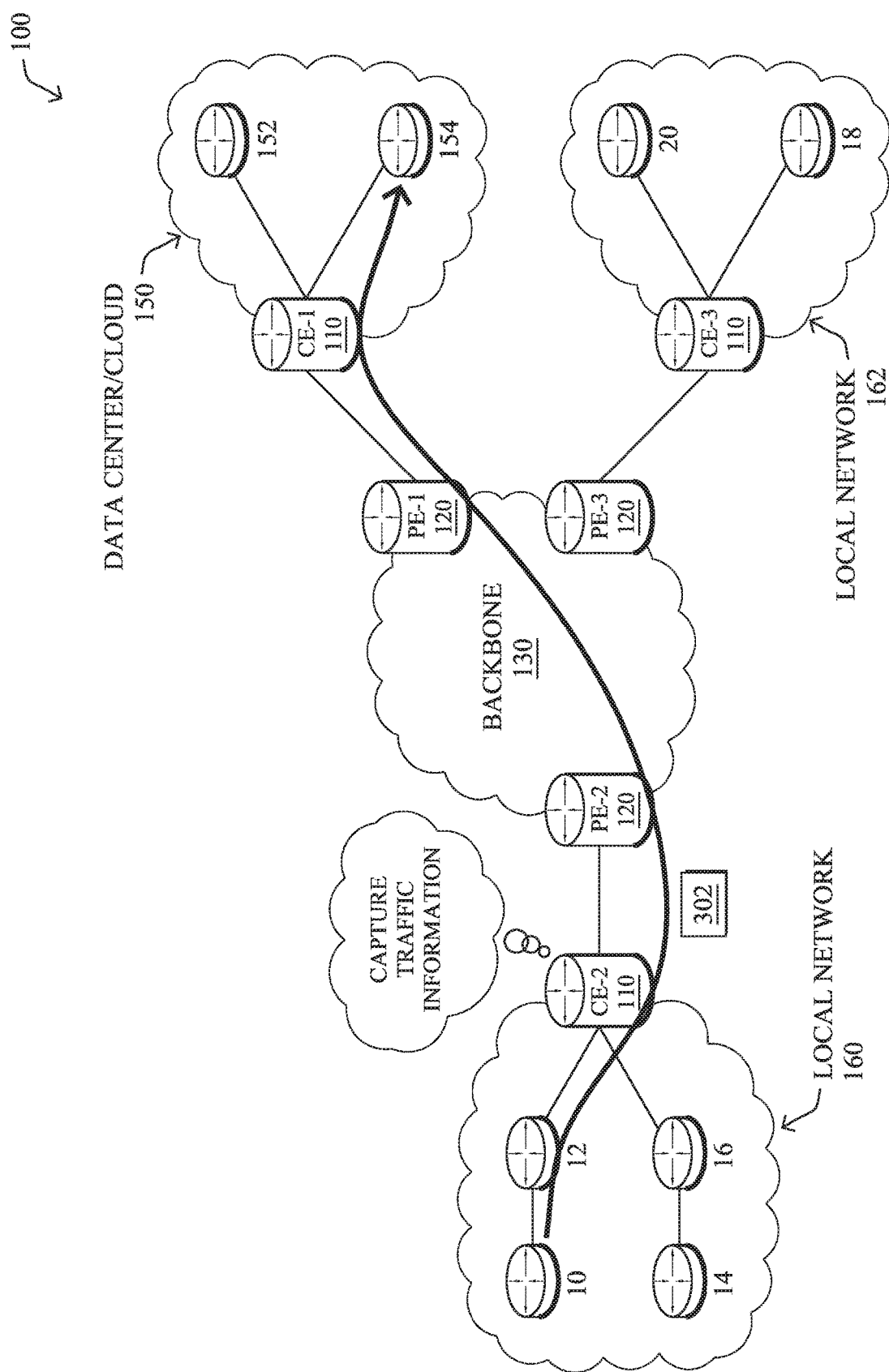
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
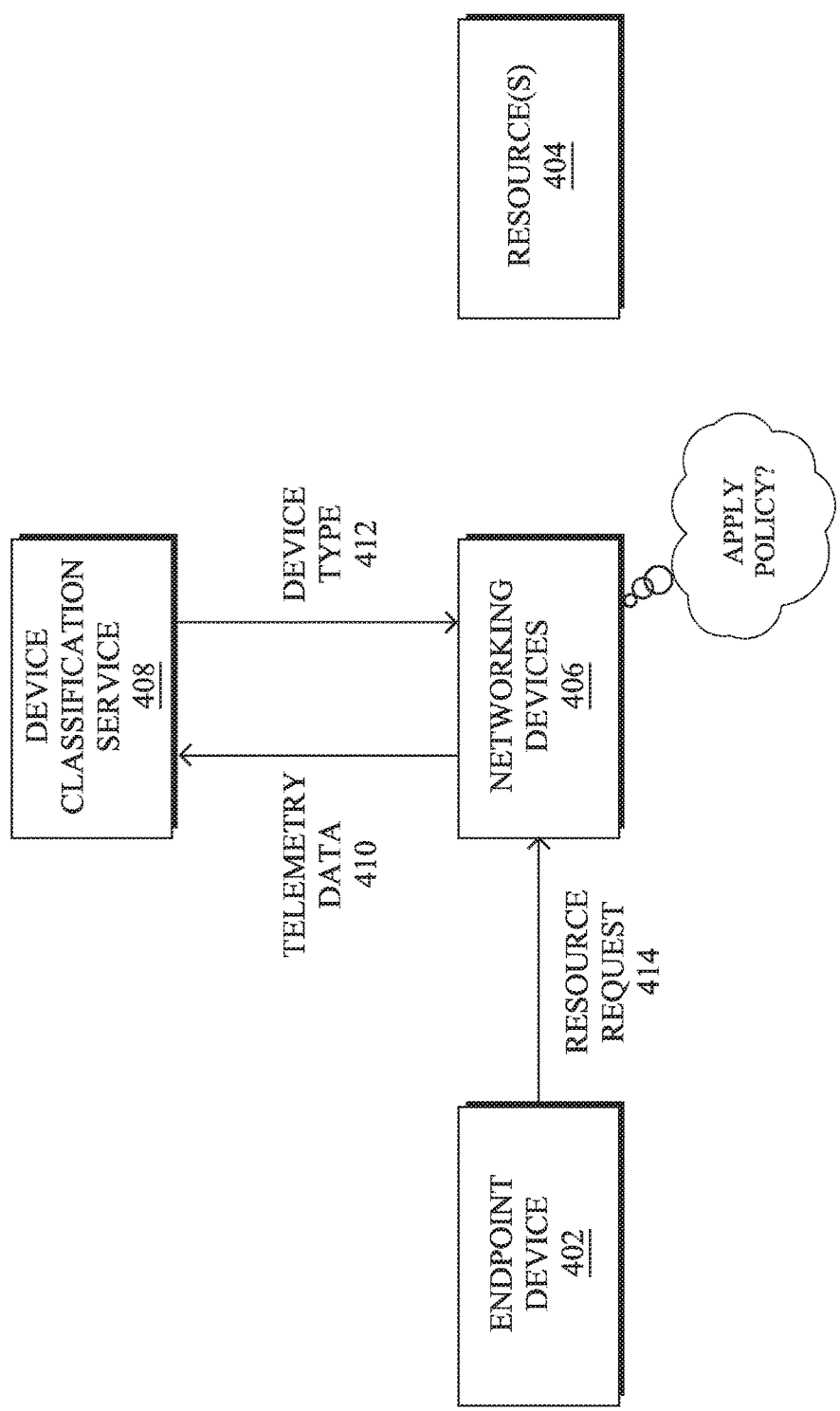
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in INIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

A device classification service may also leverage machine learning to label endpoint devices in a network with device types. Preliminary testing has shown that machine learning is particularly well suited for this purpose, as the classifier is able to label new endpoint devices, if their behaviors are similar to those of previously labeled endpoint devices. For example, the device type classifier may include a multi-class classification model such as a decisions tree based model (e.g., a random forest, etc.) trained using telemetry samples labeled with the known device types of their associated endpoint devices. In further cases, the device type classifier may leverage a machine learning-based clustering approach that uses the traffic telemetry data as input and attempts to group similarly behaving devices by their network traffic behaviors. The classifier can then propagate the device type labels of known endpoint devices to other endpoint devices in their behavioral clusters. For example, if an endpoint device under scrutiny belongs to a particular behavioral cluster based on its traffic telemetry, and that cluster includes one or more endpoint devices known to have a particular device type, the endpoint device under scrutiny can also be labeled with that device type.

While machine learning is potentially quite powerful for purposes of performing device type classifications, such approaches also require a set of labeled examples on which the classifications are to be based. In some cases, the device classification service can use active learning whereby experts are asked to provide labels for groups of endpoint devices labeled by the classifier as 'UNKNOWN,' so that the classifier can learn new device behaviors over time. One limitation of this approach is that for the labeling to be effective, groups need to be as homogeneous as possible and actually consist of multiple endpoints corresponding to a single device type. In some contexts, the network traffic and characteristics available may be too limited to assess this correctly:

As noted, the device classification service may attempt to collect data from various sources in the network such as, but not limited to, RADIUS, policy and security systems, Netflow, port scanners, deep packet inspection (DPI) from various protocols (e.g., DNS, DHCP, HTTP, specialized protocols, etc.), and any other source that can provide telemetry data regarding an endpoint device. Although this can lead to very rich descriptions of the devices, it is very common for only a handful of sources to be configured for a given system. This may be due to technical limitations, or simply due to oversight or misconfiguration. Missing data sources lead to representations that as not as rich, and that may not be able to differentiate different device types so clearly.

More generally, traffic passively extracted from network traffic may not be sufficient to correctly differentiate all types of devices. Protocols observed may be more indicative of a certain class of device than of a particular endpoint type.

In other words, active learning of labels is susceptible to mislabeling the behaviors of some endpoint devices due to a lack of sufficient features. For example, an iPhone may inadvertently be included in a group of iPads for which labeling is needed, due to a lack of sufficient features to distinguish between the two. In such a case, labeling of the group could inadvertently lead to misclassifications of iPhones having similar behavioral profiles as that of the labeled example in the group.

As noted above, another challenge associated with active labeling is cluster stability. Indeed, in some embodiments, device classification service 408 may use the captured telemetry data regarding the devices, to form device clusters of similarly-behaving devices. Doing so allows an expert to label the device clusters, as opposed to the individual devices. In turn, if the behavior of a new device in the network falls within one of these device clusters, device classification service 408 may apply the label associated with the cluster to that device. Accordingly, proper behavioral clustering of the devices is not only critical to the quality of the user experience, but also to the efficiency of the classification, since it allows service 408 to 'propagate' the labels obtained for an individual device to other unknown devices in the database. If the cluster assignments are unstable, this could lead to a particular device being assigned the wrong label.

Learning Stable Representations of Devices for Clustering-Based Device Classification Systems The techniques herein introduce a learning system that utilizes any stable attributes of the devices observed on a real network (e.g., MAC address, OUI, etc.), to optimize the feature representation used for clustering these devices. In some aspects, the learning leverages both a reconstruction loss, which tends to favor very detailed and device-specific representations, and a classification loss, which forces the representation to remain stable across time and across devices that share the same stable attribute. In further aspects, the compression factor given by the transformation of the raw input telemetry to a lower-dimensional space and affords the ability to run the clustering on this low-dimensional space. For example, in some cases, the compression can be run at the edge of the network under scrutiny and send only the compressed information to the cloud for clustering and classification, significantly reducing the communication overhead between the edge and the cloud.

Specifically, according to one or more embodiments of the disclosure as described in detail below, a device classification service obtains telemetry data for a plurality of devices in a network. The device classification service repeatedly assigns the devices to device clusters by applying clustering to the obtained telemetry data. The device classification service determines a measure of stability loss associated with the cluster assignments. The measure of stability loss is based in part on whether a device is repeatedly assigned to the same device cluster. The device classification service determines, based on the measure of stability loss, that the cluster assignments have stabilized. The device classification service obtains device type labels for the device clusters, after determining that the cluster assignments have stabilized.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Operationally, a key aspect of the techniques herein is a mechanism whereby the device clustering can be optimized without ground truth (i.e., the type of the observed devices) such that a tradeoff is made between a notion of stability (that is, devices clustered together at time t shall remain clustered together at time t+1, t+2, . . . ) and purity (that is, different devices shall be grouped into different clusters). At the same time, the proposed techniques herein naturally allow for running the clustering on heavily compressed data, and to run the compression in a computationally efficient manner. This opens up the possibility of running the compression at the network edge and sending only the compressed information to the cloud to run the clustering and labeling, thus limiting overhead.

Figure 5:
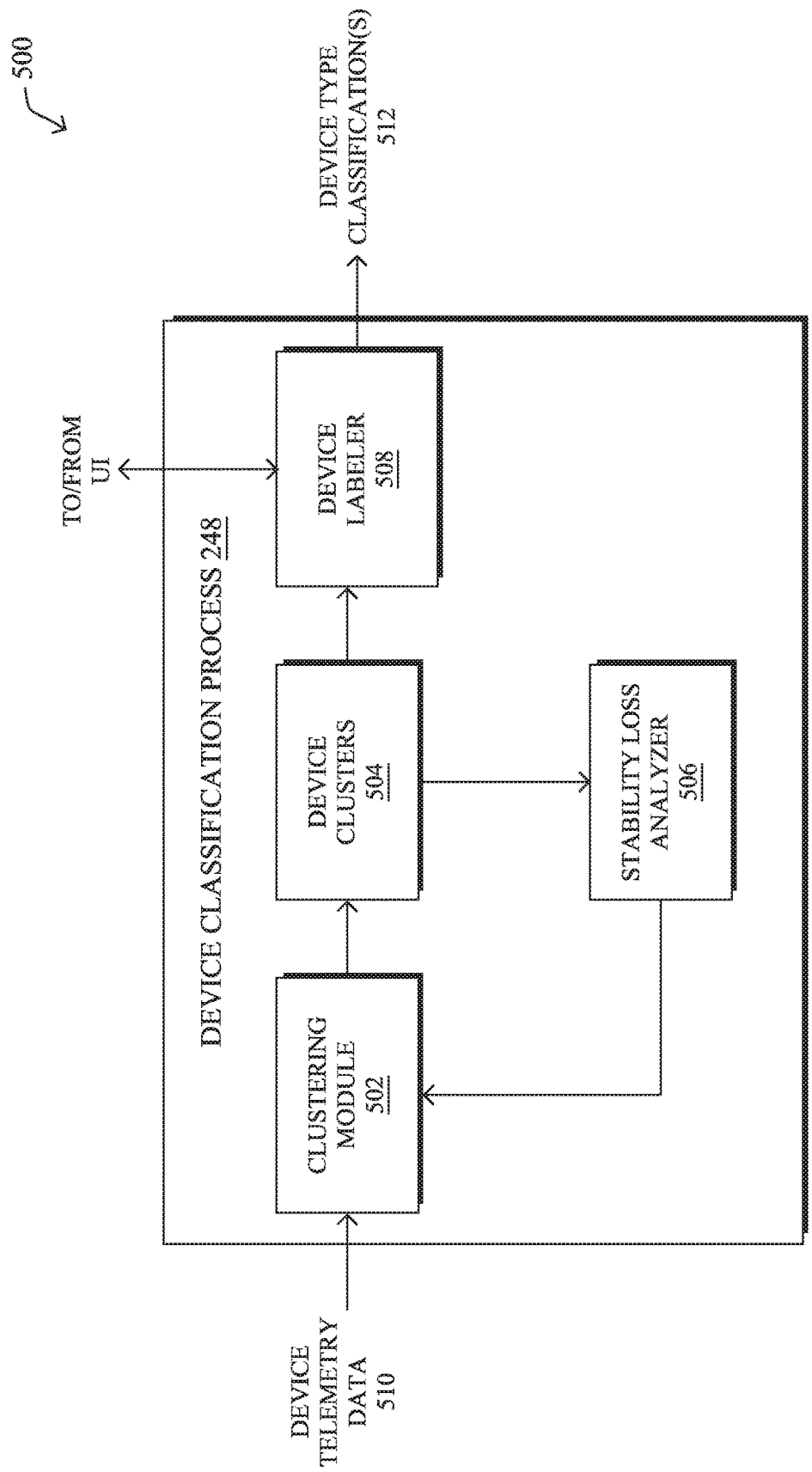
FIG. 5 illustrates an example architecture for learning stable representations of devices.

FIG. 5 illustrates an example architecture 500 for learning stable representations of devices, according to various embodiments. As shown, device classification process 248 may include any or all of the following components: clustering module 502, device clusters 504, stability loss analyzer 506, and/or a device labeler 508. These components 502-508 may be implemented in a distributed manner or implemented on a single device. In addition, some or all of components 502-508 may be implemented as part of a monitored network (e.g., at the network edge) or part of a cloud-based device classification service. The functionalities of the components of architecture 500 may also be combined, omitted, or implemented as part of other processes, as desired.

As shown, device classification process 248 may receive device telemetry data 510 regarding any number of devices undergoing device type classification. Such device telemetry data 510 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 510 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification 512 for a device under scrutiny, thereby allowing the receiving entity to apply network policies to the device, based on its device type classification 512. For example, one such network policy may cause a networking device to prevent an MRI machine from accessing the Internet via the network.

In various embodiments, the components 502-508 of device classification process 248 may leverage active learning, to assign device type classifications 512 to the devices under scrutiny. To do so, clustering module 502 may assign the devices under scrutiny to device clusters 504, based on their telemetry data 510. For example, a device cluster 504 may include those devices that exhibit the same or similar traffic or other behavioral features. If a device type is then associated with a device cluster 504, device labeler 508 may apply that type to a device as device type classification 512. In cases in which device labeler 508 is unable to classify the cluster 504 with sufficient confidence, it may send a label request to a user interface (UI), seeking active labeling of that cluster. Once the cluster is labeled by an expert, device labeler 508 can then apply that label to any other devices that fall within that cluster, as well.

More formally, let $D=\{D_1, D_2, \ldots, D_N\}$ denote the set of devices seen on a network under analysis by device classification process 248 each of which is identified by its MAC address or another unique identifier. For every device D, at time t, clustering module 502 may construct a feature vector $X_{i,t}$ from the telemetry data 510 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

A wide range of metrics exist for clustering, based on labels. However, as stated above, a challenge in building a device classification system/service is the lack of ground truth labels. Indeed, a key requirement for the use of a device type classification 512 for a given device $D_i$ is that clustering module 502 should assign that device to the same cluster in device clusters 504 in successive iterations of the clustering. Otherwise, device labeler 508 may change the device type classification 512 for the device. Although the device type of the device is not known, it is a reasonable assumption that its type should not change from one time-step to another.

In various embodiments, device classification process 248 may also include a stability loss analyzer 506 configured to ensure that the assignment of devices to device clusters 504 by clustering module 502 remain stable. More formally, stability is the property of the clustering algorithm that devices clustered together at time t are clustered again together also in subsequent runs. Note that optimizing for stability may lead to using 'stable' input features to clustering module 502, which may lead to larger, and potential less interesting/specific, clusters.

To achieve stability among device clusters 504, stability loss analyzer 506 may build a set of labels that can be used to propagate the notion of 'stability' across subsequent runs of the clustering by clustering module 502. Given clustering $C_t$ from device clusters 504, stability loss analyzer 506 may use the assignments generated by this run as a set of labels for the next iteration of clustering by clustering module 502 at time t+1. In particular, in various embodiments, the cluster assignments of device clusters 504 at time t may be used as a label to train and evaluate subsequent runs of the clustering algorithm of clustering module 502.

Figure 6:
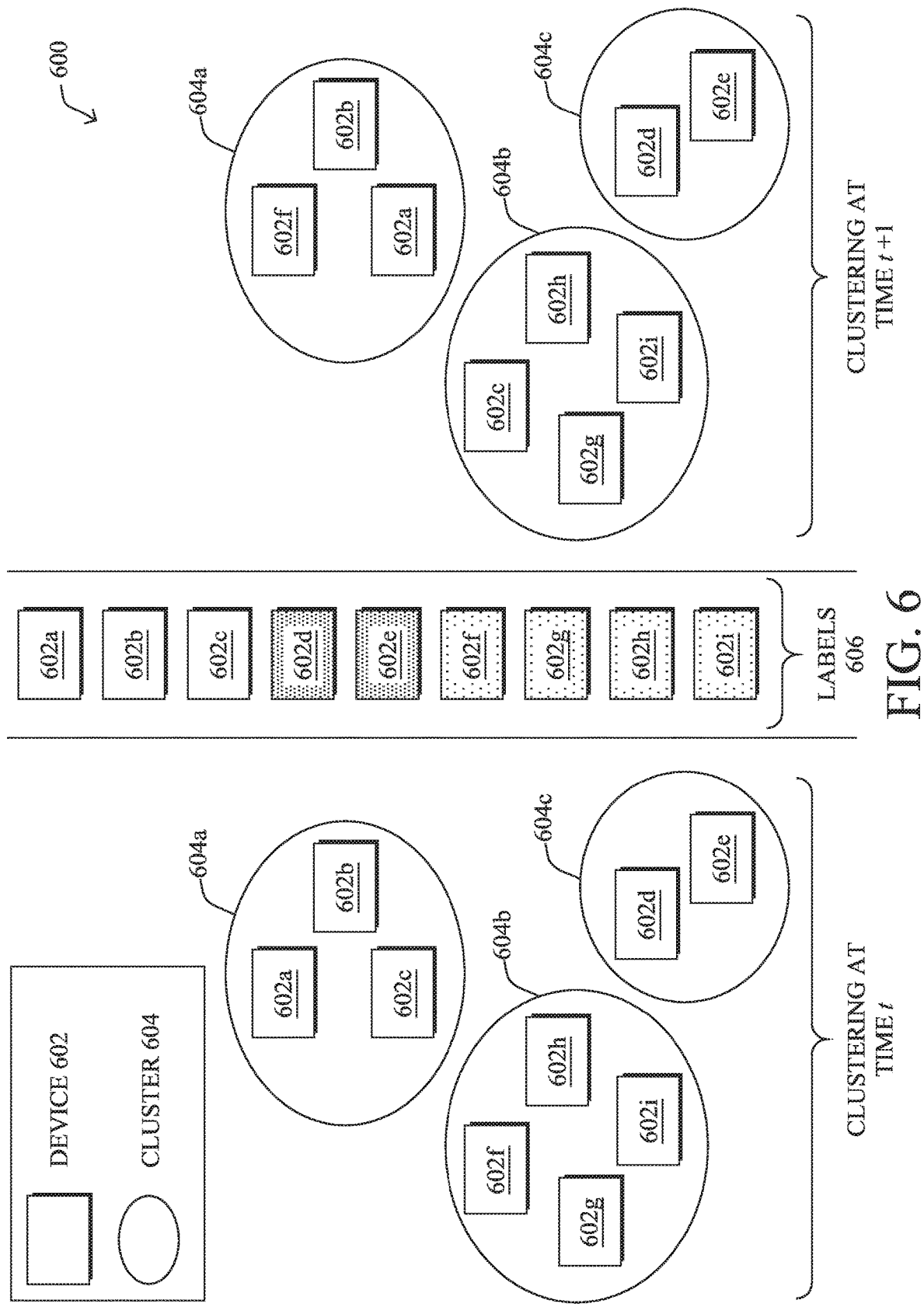
FIG. 6 illustrates an example of the clustering of devices over time.

FIG. 6 illustrates an example 600 of the clustering of devices over time. As shown, assume that the clustering algorithm assigns any number of devices 602, such as devices 602a-602i, to clusters 604 at time t, based on their telemetry data. In such a case, labels 606 can be obtained from the clustering at time t. For example, devices 602a-602c may receive a label indicative of their assignment to cluster 604a, devices 602d-602e may receive a label indicative of their assignment to cluster 604b, and devices 602f-602i may receive a label indicative of their assignment to cluster 604c.

At time t+1, devices 602a-602i may be clustered again. While most of the devices 602 are assigned to the same cluster 604, device 602f is now assigned to cluster 604a and device 602c is now assigned to cluster 604b. Thus, by comparing labels 606 with the cluster assignments at time t+1, a measure of stability can be computed. Optimally, the clustering scheme will keep the same devices in the same cluster, as time evolves.

Referring again to FIG. 5, a simple solution to ensuring stability of the cluster assignments by clustering module 502 would be to assign each device to an individual cluster or to a single global cluster. While such an approach ensures stability, doing so would also be useless, for purposes of generating device type classifications 512. Accordingly, the techniques herein propose balancing the concepts of homogeneity and completeness of the clustering by clustering module 502, both metrics allowing for an assessment of clustering solutions relying on labels.

A clustering approach has maximum homogeneity in cases whereby all clusters contain only elements belonging to one class (e.g., iPhone 8s, etc.). Maximum completeness is achieved when all elements of each class belong to one cluster and one only. It is worth noting that it is possible to construct solutions that maximize one metric while strongly penalizing the other. For instance, a clustering approach that assigns each and every device to a different cluster would have a maximum homogeneity, but minimal completeness. Conversely, if clustering module 502 assigns all devices to a single cluster, the solution would have maximum completeness and minimum homogeneity. In this sense, it can be seen how homogeneity favors finer granularity and diversity whilst completeness promotes larger clusters. It is clear that an optimal clustering algorithm is the result of a trade-off between these two opposing forces. The harmonic average of homogeneity and completeness, often denoted V-measure, can then be used stability loss analyzer 506 by for scoring the clustering algorithm of clustering module 502. The V-measure is, in fact, maximum only when the solution is perfect, that is, all clusters contain only samples coming from the same class and all samples of each class stay in the very same cluster.

In embodiments in which stability loss analyzer 506 uses the V-measure as the performance measure to optimize for clustering module 502, it may do so by optimizing the below parameters:

1. The representation $X_{i,t}$ of the device $D_i$ plays a key role in the performance of the clustering process of clustering module 502. Indeed, the representation must be detailed enough to allow for distinguishing between different types of devices, yet also be exempt from non-essential details that might cause devices of the same type to be assigned to different device clusters 504. At the same, the representation must be granular enough to avoid grouping different device in the same cluster.
2. The parameters of the clustering algorithm are also important and must be tuned in a way that maximizes the V-measure.

In some cases, stability loss analyzer 506 may leverage a meta-heuristic optimization algorithm such as genetic algorithms, Particle Swarm Optimization (PSO), or Hyperopt, to perform a search in the space of features and the space of clustering hyperparameters. However, the extremely high dimensionality of the search space, due specifically to the optimization of $X_{i,t}$, makes the problem prohibitively expensive from a computational standpoint.

Instead, in further embodiments, stability loss analyzer 506 may leverage representation learning and, more specifically, to autoencoding neural networks. The idea behind the autoencoding paradigm is to train a neural network that, given a raw representation of the device $D_i$, will attempt to learn a meaningful, low-dimensional representation of the same, while also retaining key attributes necessary to the reconstruction of the original input. In short, this is a method to learn compact, yet meaningful, representations of a high-dimensional manifold (i.e., the ensemble of all possible device representations in N-dimensional space). Such a representation is referred to herein as an 'embedding.' Contrary to classical autoencoding neural networks, the techniques herein propose using the learned embedding to cluster devices such that the V-measure is maximized. While the autoencoder approach can typically fulfill the former requirement simply by having a sufficiently large dataset, there is in principle no way of explicitly enforcing the latter.

According to various embodiments, an autoencoder-based approach can be taken to obtain an embedding that fulfills both of the above requirements. To achieve this, a fecund form of loss can be added to the neural network on top of the classical reconstruction loss used by autoencoders. This secondary type of loss is referred to as a stability loss, which can be thought of as a proxy of the stability achieved by the representation. Effectively, it means that the representation is going to be tuned towards solutions that maximize the V-measure, thus producing both homogeneous and complete clusters.

More concretely, the stability loss is effectively a cross-entropy loss computed by stability loss analyzer 506 by letting previous cluster assignments be the target labels (e.g., labels 606 in FIG. 6). A hyperparameter alpha may also be used to balance the influence of the reconstruction and stability losses at different iterations of the algorithm.

In one embodiment, pseudocode for the overall process is as follows:
t=0: Bootstrap system by training a pure autoencoder (alpha=0.0), to obtain a first embedding $X_{i,0}$.
t=0: Compute initial cluster assignments $C_0$ for all devices (e.g., using DB-scan) based on $X_{i,0}$.
t=1: Train a new embedding $X_{i,1}$ (alpha>0.0) based on $C_0$.
t=1: Compute optimal (i.e., maximizing V-measure) cluster assignments $C_1$ for all devices based on $X_{i,1}$ and $C_0$ (using DB-scan optimized via hyperopt, for instance)

t=2: Train a new embedding $X_{i,t-1}$ (alpha>0.0) based on $C_{t-1}$ t=2: Compute optimal cluster assignments $C_{t-1}$ for all devices based on $X_{i,t-1}$ and $C_{t-1}$ Continue until convergence of cluster assignments (i.e., $C_{t+1} \sim C_t$) occurs. This can be determined, for example, by comparing the number or percentage of devices that remain the same cluster across iterations of the clustering to a desired threshold.

In some cases, alpha can also be made time-dependent and increasing as time progresses, in order to allow for more and more stable representations to emerge.

To provide more detail as to why the stability loss will explicitly steer the learned representation towards stable representations that are suitable for clustering. At first, the embedding is only constrained by its dimensionality, typically significantly smaller than the input space, and its ability to capture relevant attributes of the input for reconstruction purposes. Then, at t=1, the embedding will be penalized by the stability loss if the underlying representation is too dependent on time-varying traits that cause a given device $D_i$ to be classified differently that it would have been at time t=0. Indeed, the cross-log entropy will penalize any 'cluster jump' from iteration to iteration, since it will be essentially be a misclassification. Now, the clustering will also be refined as the quality of the embedding improves, thus leading to several important outcomes: (1) a representation that is suitable for clustering devices, (2) a set of clustering hyperparameters that can be used for active labelling, and (3) a classifier that can be used for device classification.

Figure 7:
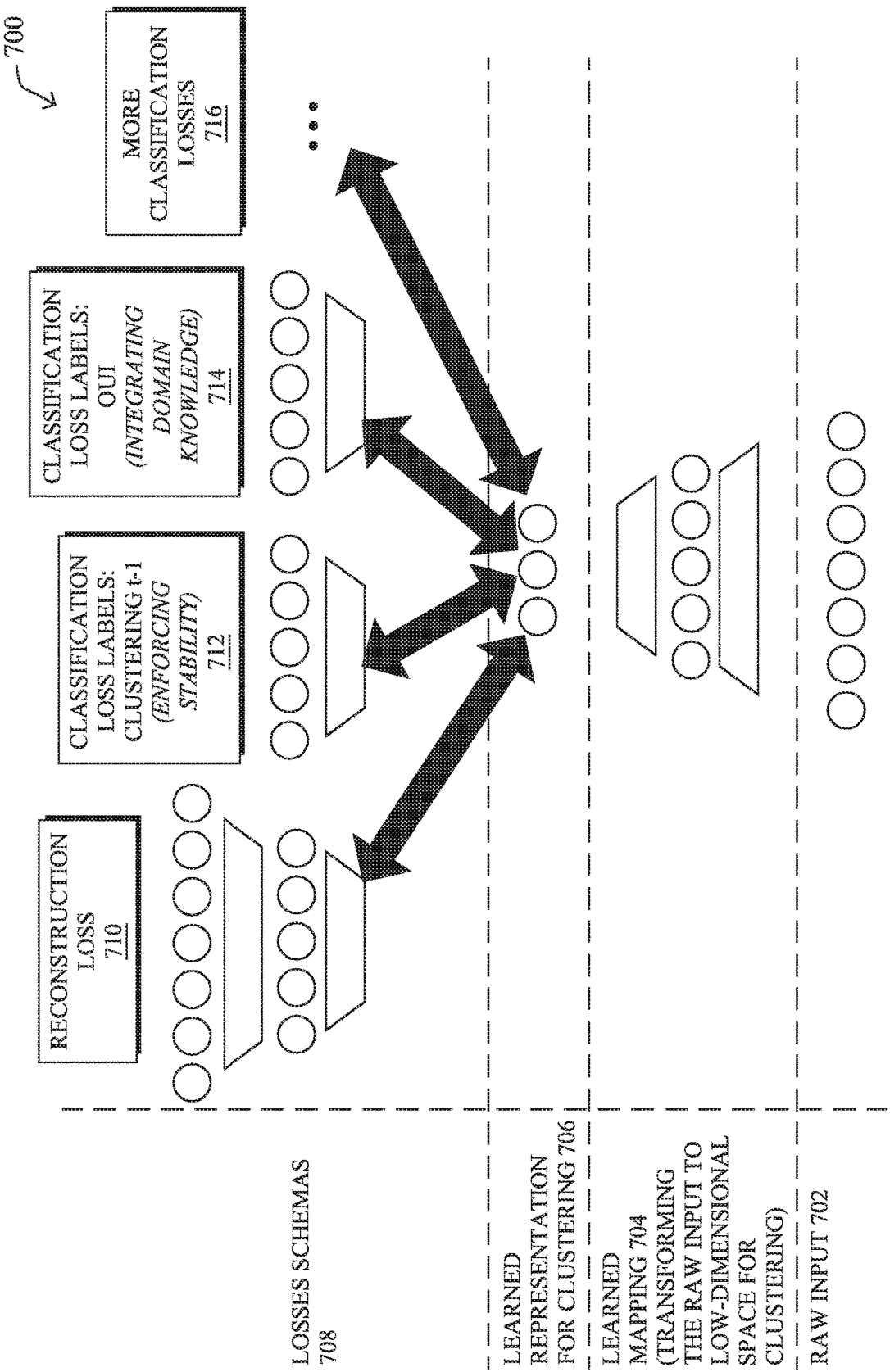
FIG. 7 illustrates an example schematic diagram for training an autoencoder.

FIG. 7 illustrates an example schematic diagram 700 for training an autoencoder, in accordance with the techniques herein. At the lowest level, the feature/telemetry data captured regarding the devices can be used as raw input 702 to the autoencoder. As a result, the autoencoder learns a mapping 704 that transforms the raw input 702 into a learned representation 706 for clustering. Such a representation 706 naturally is a lower dimensional representation of the raw input 702. In turn, the clustering is learned from the low dimensionality representation 706 of the raw input 702 using losses schemas 708. These loss schemas 708 may include reconstruction loss 710, as is typical in autoencoders. In addition, in various embodiments, the classification loss labels 712 obtained from the prior cluster assignments (e.g., from t−1), are also used as a classification loss for the autoencoder. In further embodiments, other information based on domain knowledge, such as Organizationally Unique Identifiers (OUIs) 714 and/or other classification losses 716 (e.g., user-supplied labels, etc.) can also be used for the classification loss. For example, labels provided by users or hard or soft constraints on how devices must be clustered (e.g., OUIs, etc.) can be incorporated as extra losses influencing the embedding construction.

Finally, once a stable representation 706 is learned, that is, the cluster assignment converges to a stable solution as explained above, clustering can be applied to the stable representation and device type labels assigned to the corresponding devices based on their cluster assignments. As noted, these device type labels can be obtained through active labeling by requesting labels from one or more expert users.

In some embodiments, the learning of representation 706 also allows the transformation from raw input 702 to the low-dimensional embedding space to be run in the network under scrutiny, such as at the edge of the network. This allows only the learned, low-dimensional representation 706 to be sent to the cloud for clustering, significantly reducing the traffic overhead on the WAN. The learned transformation being a neural network, it can also be made lighter and more computationally efficient by means of techniques, such as network distillation and other model compression techniques, thereby speeding up the processing at the edge further.

Figure 8:
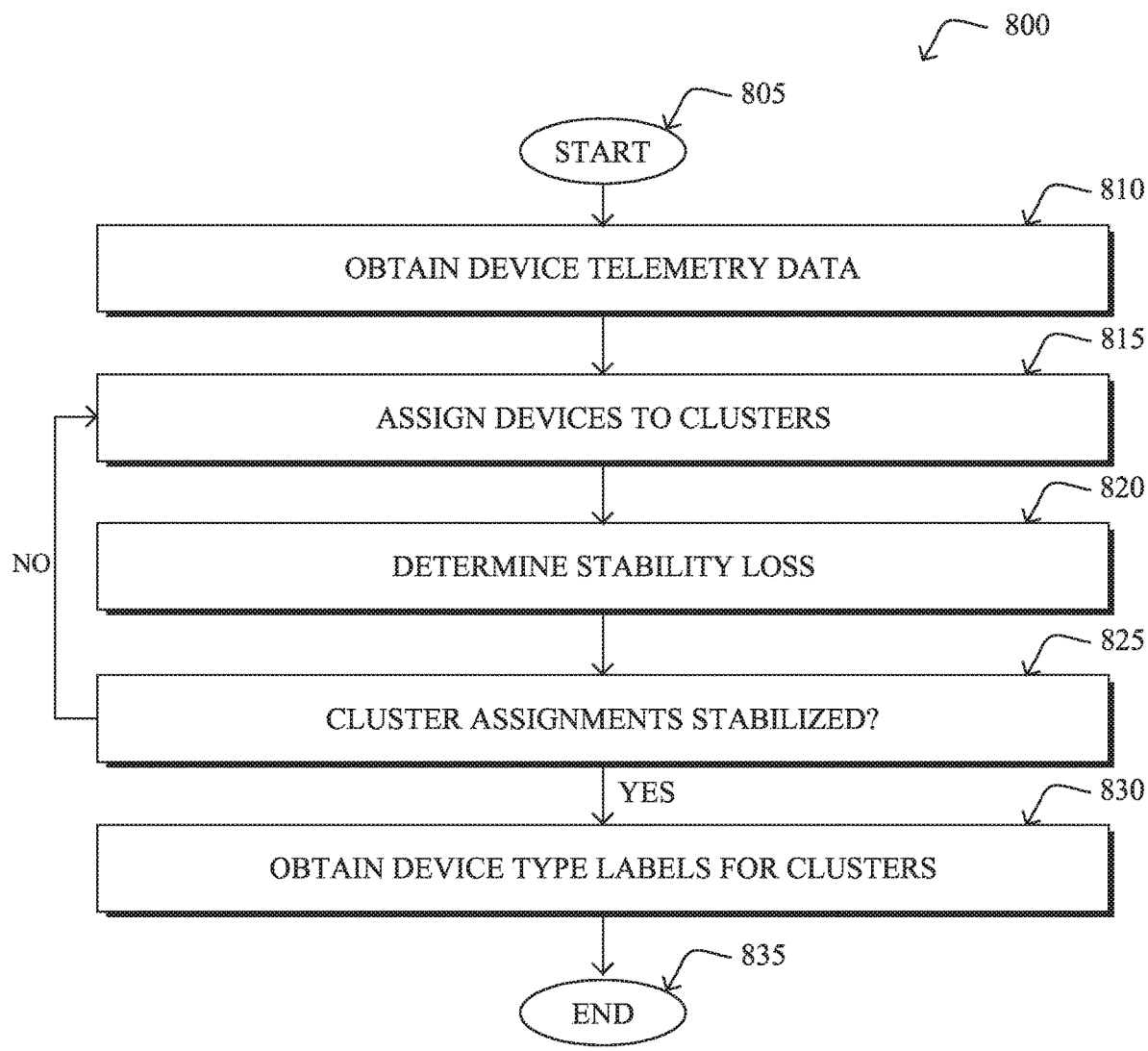
FIG. 8 illustrates an example simplified procedure for learning stable representations of devices for clustering-based device classification systems.

FIG. 8 illustrates an example simplified procedure for learning stable representations of devices for clustering-based device classification systems, in accordance with one or more embodiments described herein. For example, a non-generic, specifically configured device (e.g., device 200) may perform procedure 800 by executing stored instructions (e.g., process 248), to provide a device classification service to one or more networks. The procedure 800 may start at step 805, and continues to step 810, where, as described in greater detail above, the device classification service receives telemetry data for a plurality of devices in a network.

At step 815, as detailed above, the service may assign the devices to device clusters by applying clustering to the obtained telemetry data. In some embodiments, the service may do so by using the telemetry data as input to an autoencoder, to learn a lower dimensional representation of the telemetry data, and using the lower dimensional representation of the telemetry data as input to a clustering process. In yet another embodiment, the service may deploy the autoencoder to the network, to send the lower dimensional representation of the telemetry data to the cloud-based service. In other words, once the autoencoder has learned a lower dimensional representation of the data that results in sufficiently stable clusters, the autoencoder can be used at the network edge to reduce the overhead in performing the device classifications.

At step 820, the service may determine a measure of stability loss associated with the cluster assignments, as described in greater detail above. In various embodiments, the measure of stability loss is based in part on whether a device is repeatedly assigned to the same device cluster. For example, if the service trains an autoencoder, the cluster assignments made in step 815 can be used as classification loss labels for the autoencoder. The service can then, in some cases, use a hyperparameter to balance reconstruction loss and classification loss of the autoencoder.

At step 825, as detailed above, the service may determine, based on the measure of stability loss, that the cluster assignments have stabilized. For example, if the number or percentage of devices previously assigned to device clusters and again assigned to those same clusters exceeds a threshold, this may signify that the clusters have stabilized. If the service determines that the cluster assignments have not stabilized, or if only a single round of clustering has been performed, the service may repeat steps 815-825 until sufficient stabilization has been achieved. In some embodiments, this may correspond to a V-measure being maximized by the service.

At step 830, the service may obtain device type labels for the device clusters, after determining that the cluster assignments have stabilized. In some embodiments, for example, once the device clusters have stabilized, the service may employ active labeling or another approach, to associate device type labels with the clusters. Then, if a particular device is assigned to a particular cluster, the service can label the device as being of the device type associated with the cluster. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the stabilization of device clusters in a device classification services, thereby improving the performance of the service and reducing misclassifications. In addition, the techniques herein provide for lower dimensional representations of feature data for devices to be sent to the service for classification, using an autoencoder to learn the representations.

While there have been shown and described illustrative embodiments that provide for learning stable representations of devices, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, by a device classification service, telemetry data captured by one or more intermediate network nodes for a plurality of devices in a network;
   repeatedly assigning, by the device classification service, the devices to device clusters by applying clustering to the obtained telemetry data;
   determining, by the device classification service, a measure of stability loss associated with the cluster assignments, wherein the measure of stability loss is based in part on whether a device is repeatedly assigned to the same device cluster;
   determining, by the device classification service and based on the measure of stability loss, that the cluster assignments have stabilized; and
   obtaining, by the device classification service, device type labels for the device clusters, after determining that the cluster assignments have stabilized when a number or percentage of devices repeatedly assigned to the same device cluster exceeds a threshold during the assigning of the devices to the device clusters.

2. The method as in claim 1, wherein the obtained telemetry data is indicative of traffic features of traffic associated with the devices and observed in the network.

3. The method as in claim 1, wherein repeatedly assigning the devices to device clusters by applying clustering to the obtained telemetry data comprises:
   using the telemetry data as input to an autoencoder, to learn a lower dimensional representation of the telemetry data; and
   using the lower dimensional representation of the telemetry data as input to a clustering process.

4. The method as in claim 3, wherein the device classification service is a cloud-based service, the method further comprising:
   deploying the autoencoder to the network, to send the lower dimensional representation of the telemetry data to the cloud-based service.

5. The method as in claim 3, further comprising:
   using the cluster assignments as classification loss labels for the autoencoder.

6. The method as in claim 1, wherein the device type labels are indicative of a device operating system, a device manufacturer, a device make, a device model, or a device function.

7. The method as in claim 1, wherein the device type labels are obtained through active labeling by requesting labels from one or more expert users.

8. The method as in claim 1, further comprising:
   determining that a particular device belongs to a particular one of the device clusters; and
   assigning device type label for the particular device cluster to the particular device.

9. An apparatus, comprising:
   one or more network interfaces to communicate with a network;
   a processor coupled to the network interfaces and configured to execute one or more processes; and
   a memory configured to store a process executable by the processor, the process when executed configured to:
      obtain telemetry data captured by one or more intermediate network nodes for a plurality of devices in a network;
      repeatedly assign the devices to device clusters by applying clustering to the obtained telemetry data;
      determine a measure of stability loss associated with the cluster assignments, wherein the measure of stability loss is based in part on whether a device is repeatedly assigned to the same device cluster;
      determine, based on the measure of stability loss, that the cluster assignments have stabilized; and
      obtain device type labels for the device clusters, after determining that the cluster assignments have stabilized when a number or percentage of devices repeatedly assigned to the same device cluster exceeds a threshold during the assigning of the devices to the device clusters.

10. The apparatus as in claim 9, wherein the obtained telemetry data is indicative of traffic features of traffic associated with the devices and observed in the network.

11. The apparatus as in claim 9, wherein the apparatus repeatedly assigning the devices to device clusters by applying clustering to the obtained telemetry data by:
    using the telemetry data as input to an autoencoder, to learn a lower dimensional representation of the telemetry data; and
    using the lower dimensional representation of the telemetry data as input to a clustering process.

12. The apparatus as in claim 11, wherein the process when executed is further configured to:

deploy the autoencoder to the network of the devices, to send the lower dimensional representation of the telemetry data to the apparatus.

13. The apparatus as in claim 11, wherein the process when executed is further configured to:
use the cluster assignments as classification loss labels for the autoencoder.

14. The apparatus as in claim 9, wherein the device type labels are indicative of a device operating system, a device manufacturer, a device make, a device model, or a device function.

15. The apparatus as in claim 9, wherein the device type labels are obtained through active labeling by requesting labels from one or more expert users.

16. The apparatus as in claim 9, wherein the process when executed is further configured to:
determine that a particular device belongs to a particular one of the device clusters; and
assign device type label for the particular device cluster to the particular device.

17. A tangible, non-transitory, computer-readable medium storing program instructions that cause a device classification service to execute a process comprising:
obtaining, by the device classification service, telemetry data captured by one or more intermediate network nodes for a plurality of devices in a network;
repeatedly assigning, by the device classification service, the devices to device clusters by applying clustering to the obtained telemetry data;
determining, by the device classification service, a measure of stability loss associated with the cluster assignments, wherein the measure of stability loss is based in part on whether a device is repeatedly assigned to the same device cluster;
determining, by the device classification service and based on the measure of stability loss, that the cluster assignments have stabilized; and
obtaining, by the device classification service, device type labels for the device clusters, after determining that the cluster assignments have stabilized when a number or percentage of devices repeatedly assigned to the same device cluster exceeds a threshold during the assigning of the devices to the device clusters.

18. The computer-readable medium as in claim 17, wherein repeatedly assigning the devices to device clusters by applying clustering to the obtained telemetry data comprises:
using the telemetry data as input to an autoencoder, to learn a lower dimensional representation of the telemetry data; and
using the lower dimensional representation of the telemetry data as input to a clustering process.

19. The computer-readable medium as in claim 18, wherein the device classification service is a cloud-based service, the process further comprising:
deploying the autoencoder to the network, to send the lower dimensional representation of the telemetry data to the cloud-based service.

20. The computer readable medium as in claim 18, wherein the process further comprises:
using the cluster assignments as classification loss labels for the autoencoder.

* * * * *

UNITED STATES PATENT AND TRADEMARK OFFICE
CERTIFICATE OF CORRECTION

PATENT NO. : 11,451,456 B2
APPLICATION NO. : 16/389013
DATED : September 20, 2022
INVENTOR(S) : David Tedaldi et al.

It is certified that error appears in the above-identified patent and that said Letters Patent is hereby corrected as shown below:

In the Specification

Column 12, Line 25, please amend as shown:
address or another unique identifier. For every device $D_i$ at Signed and Sealed this
Twentieth Day of December, 2022

Katherine Kelly Vidal
*Director of the United States Patent and Trademark Office*